No. 850,385. PATENTED APR. 16, 1907.
R. W. MARVELL & H. M. ASHMAN.
SELF HEATING SOLDERING IRON.
APPLICATION FILED FEB. 16, 1906.

2 SHEETS—SHEET 1.

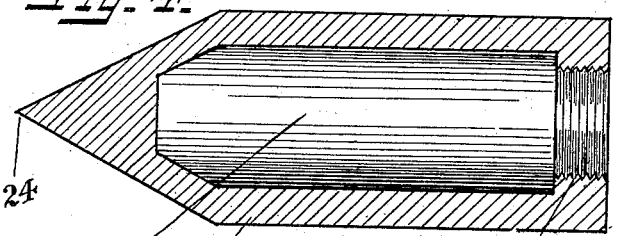
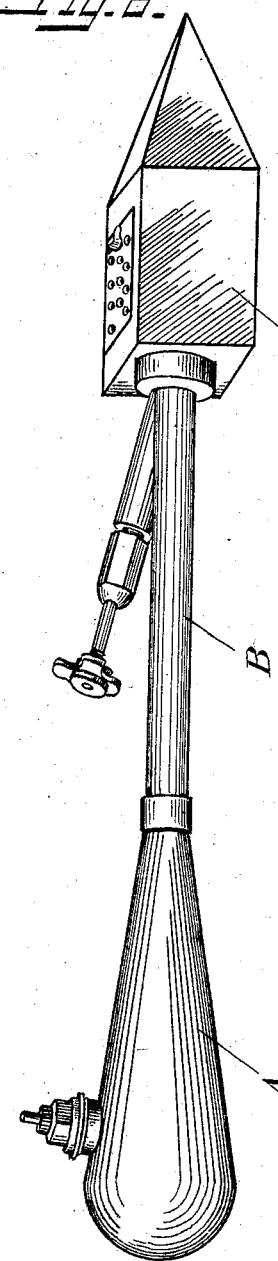
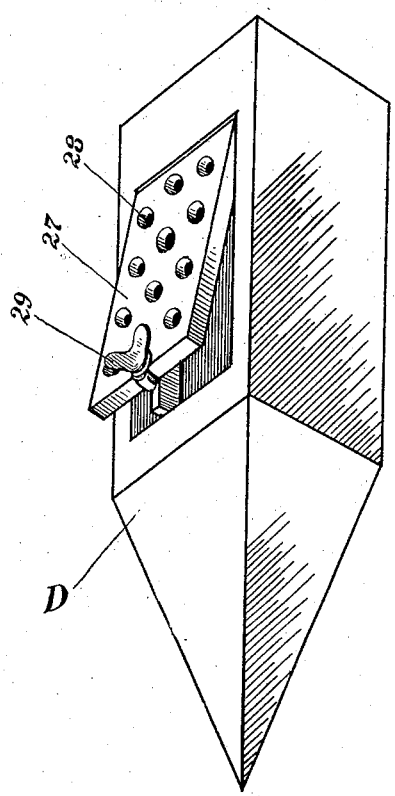

UNITED STATES PATENT OFFICE.

ROY WILLIAMS MARVELL AND HILL M. ASHMAN, OF BALTIMORE, MARYLAND, ASSIGNORS, BY MESNE ASSIGNMENTS, TO E. A. SCOTT, OF PHILADELPHIA, PENNSYLVANIA.

SELF-HEATING SOLDERING-IRON.

No. 850,385.  Specification of Letters Patent.  Patented April 16, 1907.

Application filed February 16, 1906. Serial No. 301,348.

*To all whom it may concern:*

Be it known that we, ROY WILLIAMS MARVELL and HILL M. ASHMAN, citizens of the United States, residing at Baltimore city, State of Maryland, have invented certain new and useful Improvements in Self-Heating Soldering-Irons, of which the following is a specification.

Our invention relates to an improvement in a self-heating soldering-iron, the object of which is to provide a soldering-iron with the self-heating features, so that the extra heating stove or pot used in heating the ordinary solder-iron may be dispensed with, and to provide an iron of simple construction, so that the parts can be easily assembled, quickly disconnected, and so compact that it can be conveniently carried.

With the foregoing object in view our invention consists in certain novel features of construction and combinations of parts, which will be hereinafter described, and pointed out in the claims.

Figure 1:
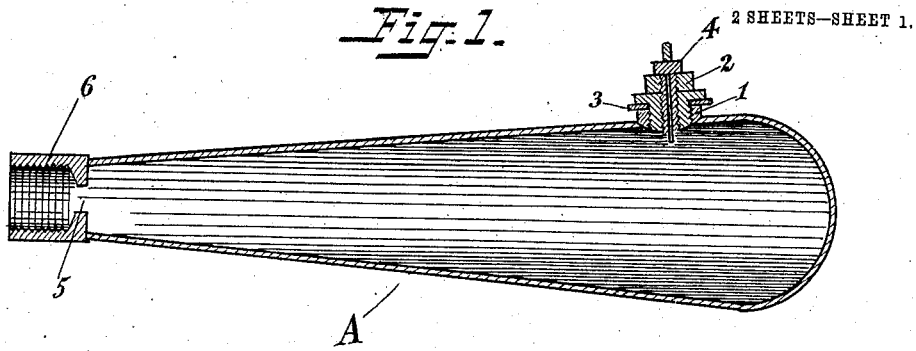
Figure 2:
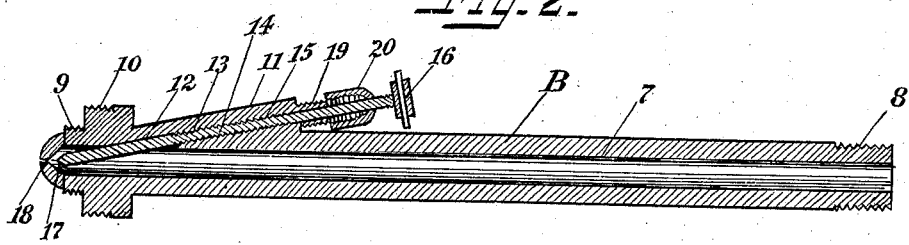
Figure 3:
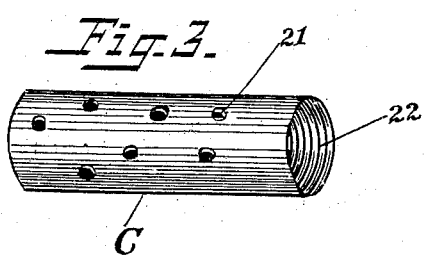

In the accompanying drawings, Figure 1 is a sectional view of the handle. Fig. 2 is a sectional view of the hollow metal connecting-rod. Fig. 3 is a perspective view of the perforated cylinder. Fig. 4 is a sectional view of the pointed iron. Fig. 5 is a perspective view of the pointed iron, showing the perforated door. Fig. 6 is a perspective view of the several parts assembled.

In Fig. 1, A is a hollow metallic handle adapted to be partially filled with gasolene. 1 is a filling-orifice, and 2 is a threaded nut-screw with a flange extending around the nut, adapted to be screwed within the orifice 1, which is inwardly threaded to receive it. Interposing between the flange on the nut and the orifice is the washer 3, to insure a perfect closure. Extending down through the nut 2 and opening within the hollow handle is an air-valve 4 for the purpose of allowing air to be forced into the hollow handle by an air-pump (not shown) and so constructed to prevent the gasolene or air therein contained to escape therethrough. The small end of the handle is provided with an outlet-hole 5 and is inwardly threaded therein at 6.

In Fig. 2, B is a hollow metal casting, being bored out at 7, threaded on one end, as designated by 8, which is adapted to be screwed within the inwardly-threaded end 6 of the handle A. The casting B is also threaded on its other end at 9 and 10 for purposes which will be hereinafter described. The casting near the threaded portions just described is enlarged at 11, and through the enlargement leading into the hollow portion 7 is drilled a hole 12, which is inwardly threaded at 13, into which is adapted to be screwed the valve-stem 14, which is threaded at 15, the outer end of which is provided with a thumb-nut 16, and the inner end is pointed at 17 to engage into the opening 18 of the casting, thereby forming a needle-valve by which the flow of the gasolene to the burner may be regulated. The enlarged end portion of the casting B is exteriorly threaded at 19, on which the cap 20 is screwed. This cap is inwardly threaded for this purpose and is provided with a hole in the top part thereof to allow the valve-stem to pass through. Also on the inside near the upper end thereof is provided a packing (not shown) which fits closely around the valve-stem within the cap, making the valve practically air-tight.

In Fig. 3 C is a hollow cylinder perforated at 21 and inwardly threaded at 22, adapted to be screwed on the threaded end of the casting B at 9 and is adapted to be inserted within the hollow iron D by means 26, as shown in Fig. 4, which iron is cast of copper, being pointed at 24, hollowed out at 25, and inwardly-threaded at 26 to engage and to be screwed on the casting B by reason of the threaded end portion 10 being screwed thereinto.

In Fig. 5 the iron D is provided with a hinged door 27, (hinges not shown,) said door being perforated at 28 and provided with a thumb-latch 29 to secure it when closed. The door is provided for the purpose of rendering the interior thereof easily accessible for the purpose of cleaning it. The perforations are for the purpose of providing an adequate draft. The cylinder extended within the iron is likewise perforated for the same reason and for the purpose of facilitating the combustion and distributing the heat within the iron.

Our invention is assembled and is operated as follows: The casting B is connected with the hollow handle A by the means hereinabove described. The cylinder C is then screwed on the end of the casting B by means of the threaded end 9 engaging in the threaded end 22 of the cylinder. The cylinder C is then inserted within the hollow iron D, and the casting B in Fig. 2 is screwed in the threads 26 of the iron D. The handle A is partially filled with gasolene, preferably about one-half. An air-pump is then attached to the valve 4 on the handle and air is pumped into the handle, the pump then removed. The needle-valve is then opened by turning the thumb-nut 16 on the valve-stem, allowing the gasolene to flow out through the hole 18 of the casting B. The door 27 of the iron D is opened and the gasolene ignited through the perforation 21 of the cylinder C. The door is then closed, secured by the thumb-latch 29, and within a short time the iron becomes sufficiently heated to perform the functions of a soldering-iron and is ready for use. In the meanwhile if the iron becomes too hot it can be regulated by the needle-valve, and when desired the fire can be extinguished by stopping the flow of fuel. This is done by turning the thumb-nut which controls the valve-stem, screwing the stem down until the point 17 is screwed within the hole 18, thereby closing and shutting off the fuel-supply.

Slight changes might be resorted to in the form and arrangement of the several parts described without departing from the spirit and scope of our invention, and hence we do not desire to limit ourselves to the exact construction as herein set forth; but, Having fully described our invention, what we claim as new, and desire to secure by Letters Patent, is—

1. The combination of a self-heating soldering-iron comprising a hollow metal handle, a hollow connecting-rod casting, a hollow pointed iron provided with a perforated door secured thereto and a latch on the door for securing it shut, substantially as described.

2. The combination of a self-heating soldering-iron comprising a hollow metal handle, a combination filling means and valve in the handle, a hollow connecting-rod casting provided with a needle-valve therein, a hollow pointed iron, a perforated cylinder on one end of the rod and adapted to be extended within the iron, a perforated door hinged to the said iron and provided with a latch for securing the door shut substantially as described.

In testimony whereof we affix our signatures in presence of two witnesses.

ROY WILLIAMS MARVELL.
HILL M. ASHMAN.

Witnesses:
E. WALTON BREWINGTON,
MARY M. MAGRAW.